US006662179B2

(12) United States Patent
Benjamin et al.

(10) Patent No.: US 6,662,179 B2
(45) Date of Patent: Dec. 9, 2003

(54) RELATIONAL DATABASE METHOD FOR ACCESSING INFORMATION USEFUL FOR THE MANUFACTURE OF, TO INTERCONNECT NODES IN, TO REPAIR AND TO MAINTAIN PRODUCT AND SYSTEM UNITS

(75) Inventors: Scott Jon Benjamin, Lakeville, MN (US); John Hans Raisanen, Cottage Grove, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/131,508

(22) Filed: Jun. 11, 2002

(65) Prior Publication Data

US 2003/0023611 A1 Jan. 30, 2003

Related U.S. Application Data

(62) Division of application No. 09/270,587, filed on Mar. 18, 1999, now Pat. No. 6,438,535.

(51) Int. Cl.[7] .............................. G06F 17/30; G06F 7/00
(52) U.S. Cl. ......................................................... 707/3
(58) Field of Search ........................ 707/1, 10, 3, 200; 711/111–112

(56) References Cited

U.S. PATENT DOCUMENTS

| 5,210,686 A | 5/1993 | Jernigan |
| 6,023,699 A | 2/2000 | Knoblock et al. |
| 6,058,397 A | 5/2000 | Barrus et al. |
| 6,226,711 B1 | 5/2001 | Fisher et al. |

Primary Examiner—Shahid Al Alam
Assistant Examiner—Cam Y T Truong
(74) Attorney, Agent, or Firm—Patrick M. Hogan; Kevin W. Lyr

(57) ABSTRACT

A process provides automated coherent documentation of the construction of variably configured assemblies and systems, which consist of mechanical, electrical or electronic subassemblies or components using relational database software. A relational database software program is used to define the location of subassemblies or components within the final assembly or system, define important configuration information for the subassemblies and define the interconnection of the subassemblies within the assembly or system. This process improves upon prior art utilizing schematics, assembly drawings, parts lists and configuration logs based upon ANSI standard documentation practices by reducing the time required to produce such documentation and improving the accuracy of such documentation. The use of a relational database allows for various data manipulations that may be desirable such as error prevention error detection, data analysis and specified searches.

11 Claims, 11 Drawing Sheets

| Reference Designator | Part Number | Description | Proc Group |
|---|---|---|---|
| A0 | 7377431+00 | CABINET ASSEMBLY | |
| | Serial Number | 401 | |
| A1A3A1 | A4261A/204 | CCA, PROCESSOR, 6UVME, 100MHZ | 1 |
| | Revision | B | |
| | Serial Number | 4OSMBN7284 | |
| | Firmware Revision | 307.0.3 | |
| A1A3A2 | A4261A/204 | CCA, PROCESSOR, 6UVME, 100MHZ | 2 |
| | Revision | B | |
| | Serial Number | 4OSMBN7376 | |
| | Firmware Revision | 307.0.3 | |

Figure 5

Seagate ST32340N 2GB Hard Disk
Sheet 1 of 1

| Proc Group | OS Description | Proc Group Description | Root Pswd | Boot Path |
|---|---|---|---|---|
| 1 | HP-UX 9.05 | U11 | ADS | SCSI - LUN 6 |

| Reference Designator | Description | |
|---|---|---|
| A1A3A1 | CCA, PROCESSOR, 6UVME, 100MHZ | |
| A1A3A2 | CCA, PROCESSOR, 6UVME, 100MHZ | |
| A1A4A1A1A1 | SOFTWARE BASELINE 4.2.2.1 -- HP-UX9.05 | |
| Parameter Group | Software Configuration | |
| Backup Tape ID | 123.456 | |
| OS Revision | HP-UX9.05.07 | |
| Parameter Group | Installed Drivers | |
| Diagnostics Revision | 2.9 | |
| NTP Revision | 3.4.x.2 | |
| Power Temp. Control Revision | 2.4 | |
| Print Manager Revision | 2.0 | |

*Figure 8*

| Reference Designator | Part Number | Description | | Proc Group |
|---|---|---|---|---|
| A1A3A1 | A4261A/204 | CCA, PROCESSOR, 6UVME, 100MHZ | | 1 |
| | Parameter Group | Networking Parameters | | |
| | Alias(es) | u11 | | |
| | Host Name | u11.site.company.com | | |
| | Internet Mask | 255.255.255.0 | | |
| | IP Address | 123.123.123.123 | | |
| | Parameter Group | SCSI Parameters | | |
| | Bus Controller | Yes | | |
| | Logical Unit Number | 7 | | |
| A1A3A2 | A4261A/204 | CCA, PROCESSOR, 6UVME, 100MHZ | | 2 |
| | Parameter Group | Networking Parameters | | |
| | Alias(es) | u12 | | |
| | Host Name | u12.site.company.com | | |
| | Internet Mask | 255.255.255.0 | | |
| | IP Address | 234.234.234.234 | | |
| | Parameter Group | SCSI Parameters | | |
| | Bus Controller | Yes | | |
| | Logical Unit Number | 7 | | |

Figure 9

| Reference Designator | Interface | Interface Description | Reference Designator | Interface | N/C |
|---|---|---|---|---|---|
| A0 | A15E1 | Safety Ground | W18 | A15E1 | |
| A1 | J1 | SCSI Bus | W10 | P2 | |
| A1 | J2 | SCSI Bus | | | Yes |

Figure 10

| Reference Designator | IF Name | Tag Part Number | Tag Marking |
|---|---|---|---|
| W100A | P1 | TMS-CM-1/4-4H-9 | W100A P1 (A14 J7) |
| W100A | P2 | TMS-CM-1/4-4H-9 | W100A P2 (A43 POWER) |

Figure 11

RELATIONAL DATABASE METHOD FOR ACCESSING INFORMATION USEFUL FOR THE MANUFACTURE OF, TO INTERCONNECT NODES IN, TO REPAIR AND TO MAINTAIN PRODUCT AND SYSTEM UNITS

Cross-Reference to Related Patent Application

This is a Divisional Application of co-pending U.S. patent application, Ser. No. 09/270,587, that was filed on Mar. 18, 1999 in the names of Scott Jon Benjamin and John Hans Raisanen, which is assigned to Lockheed Martin Corporation; now U.S. Pat. No. 6,438,535.

NOTICE OF U.S. GOVERNMENT RIGHTS

The U.S. Government has a paid-up license in this invention, and the right, in limited circumstances, to require the patent owner to license others on reasonable terms as provided by "Contract No. 00024-94-D-5204, awarded by the U.S. Navy."

FIELD OF THE INVENTION

The invention relates generally to documentation of the construction of assemblies and systems and more particularly to the use of relational database software for the automated production of documentation for the construction and support of variably configured electrical or electronic assemblies and systems, including electronic assemblies and systems.

BACKGROUND OF THE INVENTION

Documentation of the construction of electrical or electronic assemblies and systems is commonly accomplished with schematics, assembly drawings, parts lists and configuration logs. Schematics and assembly drawings are generated by drafting a design using either traditional manual drafting tools such as paper, pencil, triangles, squares, etc. or by modern computer aided design (CAD) software tools. Both of these methods result in drawings (illustrations and text) identifying the proper construction of electrical, electronic and mechanical subassemblies and assemblies. Parts lists or Bill of Materials are generally tabular information containing information such as the part number, description of the part, quantity of part used, unit of measure, source of supply and reference designated location of use. A configuration log is a parts list for a specific assembly potentially including identification information of the subassemblies contained within the assembly.

The purpose of a schematic is to illustrate the physical interconnection of components. The accuracy of a schematic may depend upon its use. An electrical schematic used to fabricate a printed circuit board needs to be very accurate for the circuit board to perform its intended function. On the other hand, a schematic for the wiring of a house may not need to be completely accurate for the wiring in the house to operate correctly because the electrician wiring the house can correct errors during installation.

The purpose of assembly drawings is to illustrate the mechanical assembly process and desired end result for the combination of several components. The accuracy of an assembly drawing also may depend upon its use. The architectural plans for a house may be very detailed when necessary to achieve a specific observable result, but may also be vague when details are left to the discretion of a skilled craftsman. For a high volume product produced by a factory, the drawings may need to be very accurate due to a company policy for documentation control or they may be allowed to be inaccurate when the factory has implemented other processes to correct the deficiencies. An assembly drawing will often contain instructions in addition to illustrations for clarity.

The purpose of the parts list is to identify the components required to produce an assembly. The parts list is often complemented with the schematic and/or assembly drawings to aid the assembler in achieving the desired result or end item. The parts list is typically correlated to the schematic by a reference designator which is an alpha-numeric string unique to the location of each part. The parts list is also typically correlated to the assembly drawing by either the reference designator or an item number which also uniquely identifies the location of each part.

The purpose of a configuration log is to record data such as serial numbers and parts numbers for subassemblies that make up an assembly. Manufacturers use configuration logs to record products shipped and shipping dates usually to identify the product's warranty period or collect data about customers buying habits.

The industry standard for defining reference designated location of use is ANSI Y32.16-1975. This specification provides a method for defining and utilizing uniquely identified locations for components, subassemblies, assemblies and cables, as well as standards for marking such items to aid in construction.

Documentation produced by these traditional means is often error prone due to the inability of disparate systems to fully inter-operate. Factories responsible for the construction of assemblies often require several cycles of correction to the documentation in order to improve its clarity, consistency and correctness.

These traditional systems may also be time-consuming and therefore costly. They are usually very general purpose and therefore require very detailed and careful input and checking, especially for consistency between systems. Since the quality of the documentation is entirely determined by the care of the drafter and checker, inconsistent, missing, and misleading or ambiguous results are common.

Traditional systems work well for documenting assemblies with limited configuration options. Conversely, these systems are not as efficient for documenting the assembly instructions for highly re-configurable or variable systems.

An accurate database of configuration information may benefit a customer when a repair for an assembly is required. The information contained in the database may be essential to the repair and not readily available from other sources. For example, a repair manual for a highly re-configurable assembly may simply not be able to identify all configuration options and corresponding repair procedures.

The present invention complements the traditional methods of documenting re-configurable assemblies by simplifying the creation of the variable portion of the documentation for assemblies with significant configuration options.

SUMMARY OF THE INVENTION

Tabular and other data representing the construction of assemblies and systems is entered in a relational database. The relational database produces output consisting of reports representing the construction of the assembly. The relational database is preferably structured to use an applicable industry standard such as ANSI Y32.16-1975 specifications with modifications necessary to allow for the coherent representation of data within a relational database.

The relational database contains two categories of information. The first category consists of lookup tables containing commonly or repetitively used data. The second category is assembly specific tables containing links or relationships to the lookup tables for commonly used data and additional data unique to the particular assembly.

The lookup tables contain two types of data. The first type defines the generic or unpopulated assembly by its list of reference designated locations. For example, for electrical and electronic assemblies, the list of locations may exclude cables since cables interconnect subassemblies at different locations. However, cables are identified by unique reference designators. The second type defines the list of all components and subassemblies (parts) and their characteristics. The characteristics of components and subassemblies may include configuration parameters and interfaces. Configuration parameters are significant elements of data about a component or subassembly. Interfaces are places on the component or subassembly where electrical or mechanical connections from other components or subassemblies are possible. The definition of the reference designated locations may restrict the parts eligible for use in any particular location. The definition of the interfaces may restrict the eligibility of mating interfaces for later assembly. Additionally, parts may be categorized into part types. Some part types may have common properties that differ from other part types. For example, cables may be excluded from location definitions or software may be excluded from supporting the definition of interfaces.

The assembly specific data tables combine the definition of reference designated locations with a list of parts specific to an assembly. The characteristics of the specific parts used in the assembly are available from the relationship to the parts definition contained in the parts list lookup tables. The assembly specific data includes relationships defining the reference designated locations, the specific parts list and additional unique part characteristic data such as configuration parameter values and interconnection data. The values of configuration parameters provide data unique to the use of a part within a specific assembly. The interconnection data provides a cross reference of electrical and mechanical connections within a specific assembly. A specific assembly may either be a specific configuration of an assembly produced in some quantity or a unique assembly, perhaps identified by a serial number. The fundamental process for defining an assembly consists first of creating a list of parts. The parts are then assigned to the pre-defined locations within the final assembly. Then the parts are interconnected within the assembly and finally, configuration parameter values are assigned. A report may be generated to present this information in an orderly, understandable way. Other data managed by the database may require additional steps in the fundamental process.

The benefit of having a definition of the reference designated locations in the assembly is that parts may be selected from the parts list and assigned to appropriate locations (where they belong). The benefit of having a definition of the characteristics of a part is that the important characteristics of a part are known and recorded consistently. The benefit of having a definition of the interfaces of a part is that the definition of one interface may be used to select an appropriate mating interface. The existence of these definitions, which only occurs once for each assembly and part, enables the rapid construction of many different configurations of the parts within the assembly. The use of a relational database to perform this process enables the addition of significant error prevention and error detection capabilities to the process, thus enhancing the accuracy of the data contained within the assembly definition. The database also allows reporting of almost any conceivable data analysis.

A single database may contain any number of reference designated location definitions, part definitions and assembly definitions. A good database design would incorporate user friendly forms for user data input and various reports that may be printed for reference. The preferred embodiment will present the underlying schema or database table structure for the present invention. The process for using the database will be shown. The user interface, query and report designs are not presented in this document as their implementation will be readily apparent to one skilled in the art. A sample report from the database is presented to support the preferred embodiment.

The preferred embodiment presents a relational database system for defining the construction of variably configured computer systems. These computer systems consists of cabinets populated with modular components such as power supplies, circuit card assemblies, mass memory devices, loaded software, and human machine interface (HMI) devices such as keyboards, trackballs and monitors. The invention, however, is not limited to the construction, repair or maintenance of such computer systems. It may be used for virtually any item of manufacture, particularly with products have a variety of different configurations, such as automobiles and many other types of goods. The described embodiment may also be used to document the configuration of a system of computers on a local area network in a building. In its most general sense, the present invention documents a system of interconnected nodes at specified physical locations, the nodes having various properties or configuration parameters that define their function. In the claims of this document, the word "unit" includes items of manufacture as well as interconnected node systems, or for the wiring of buildings, ships, planes, telephone switching centers and many other applications.

BRIEF DESCRIPTION OF THE DRAWINGS

FIG. 1 shows the relational database schema for the parts definition lookup tables including the part type table 100, the part list table 102, the kit definition table 104, the interface definition tables 106, 108 and 110 and the parameter definition tables which include 112, 114, 116 and 118.

FIG. 2 shows the relational database schema for the reference designated location definition lookup tables 200, 202 and 204 and associated part family definition tables 206 and 208. FIG. 2 also shows the configuration management tables 210 and 212.

FIG. 3 shows the relational database schema for the assembly, otherwise known as Unit, configuration tables including the unit definition 300, the unit parts list 302, the unit configuration parameters 304, the unit interconnect 306, the unit processor group definition 308 and the operating system definition table 310.

FIG. 5 shows a sample database report containing parts list information.

FIG. 8 shows a sample database report containing a processor group definition.

FIG. 9 shows a sample database report containing a configuration parameter definition.

FIG. 10 shows a sample database report containing an interconnect cross reference.

FIG. 11 shows a sample database report containing a cable tag marking reference.

DESCRIPTION OF THE PREFERRED EMBODIMENT

Figure 1:
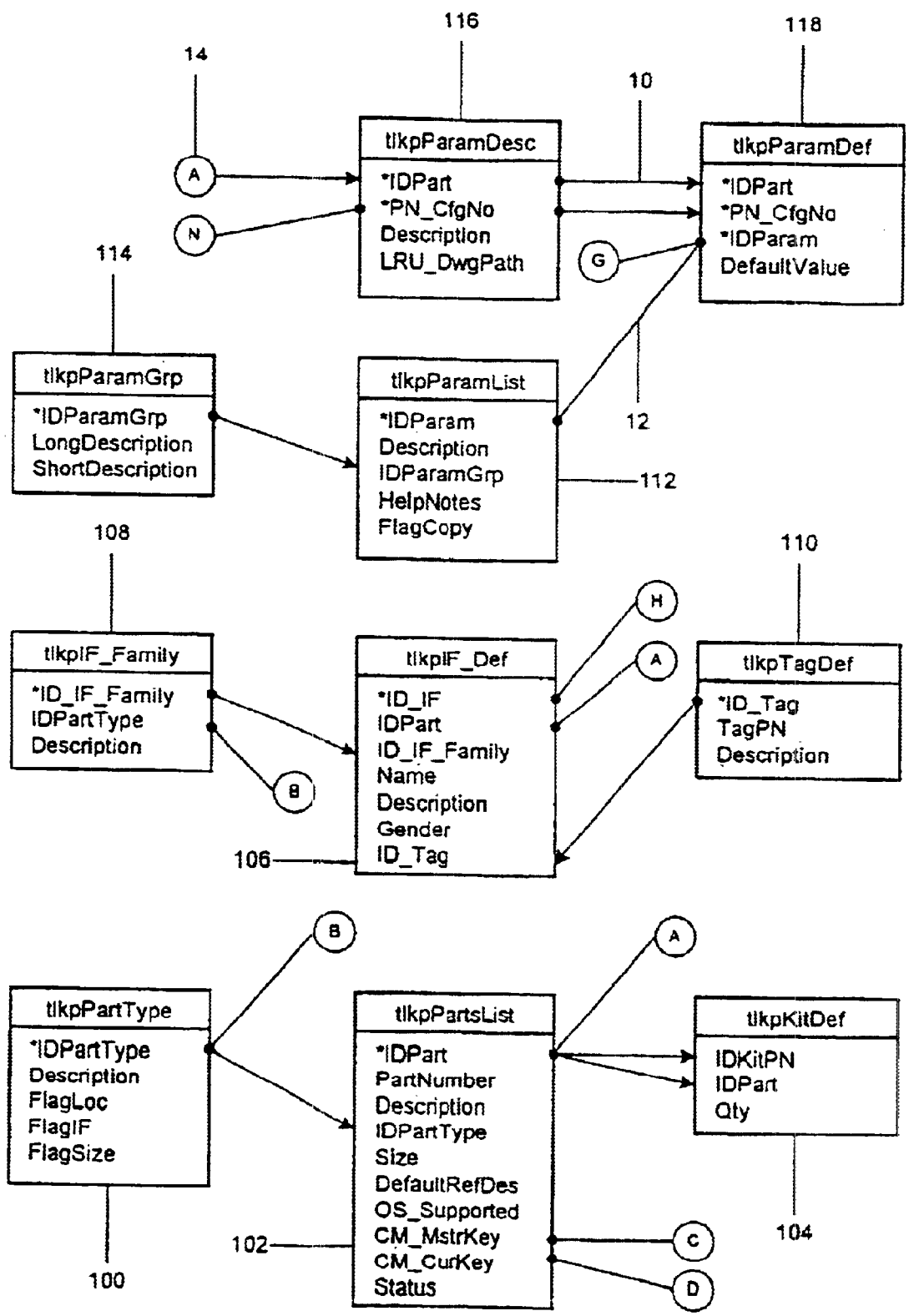
FIGS. 1, 2 and 3 show the relational database schema. Each table 100 has a name in the header and a list of fields. Field names that include a preceding asterisk "*" are fields that make up the primary key for the table. The primary key is a unique entry in the table. When the primary key name begins with "ID", a counter field is assumed to insure uniqueness. When multiple fields make up the primary key, they are sorted top to bottom in order of increasing uniqueness. Two kinds of relationships between tables are shown. The first is a one-to-many relationship depicted as line with an arrow 10 where the arrow points from the one table to the many table. The second kind of relationship has no arrows 12 and indicates that the corresponding fields are related but not strictly. To reduce clutter, connectors such as 14 are added to relationship lines. Connectors mate with other connectors containing the same letter.
Figure 2:
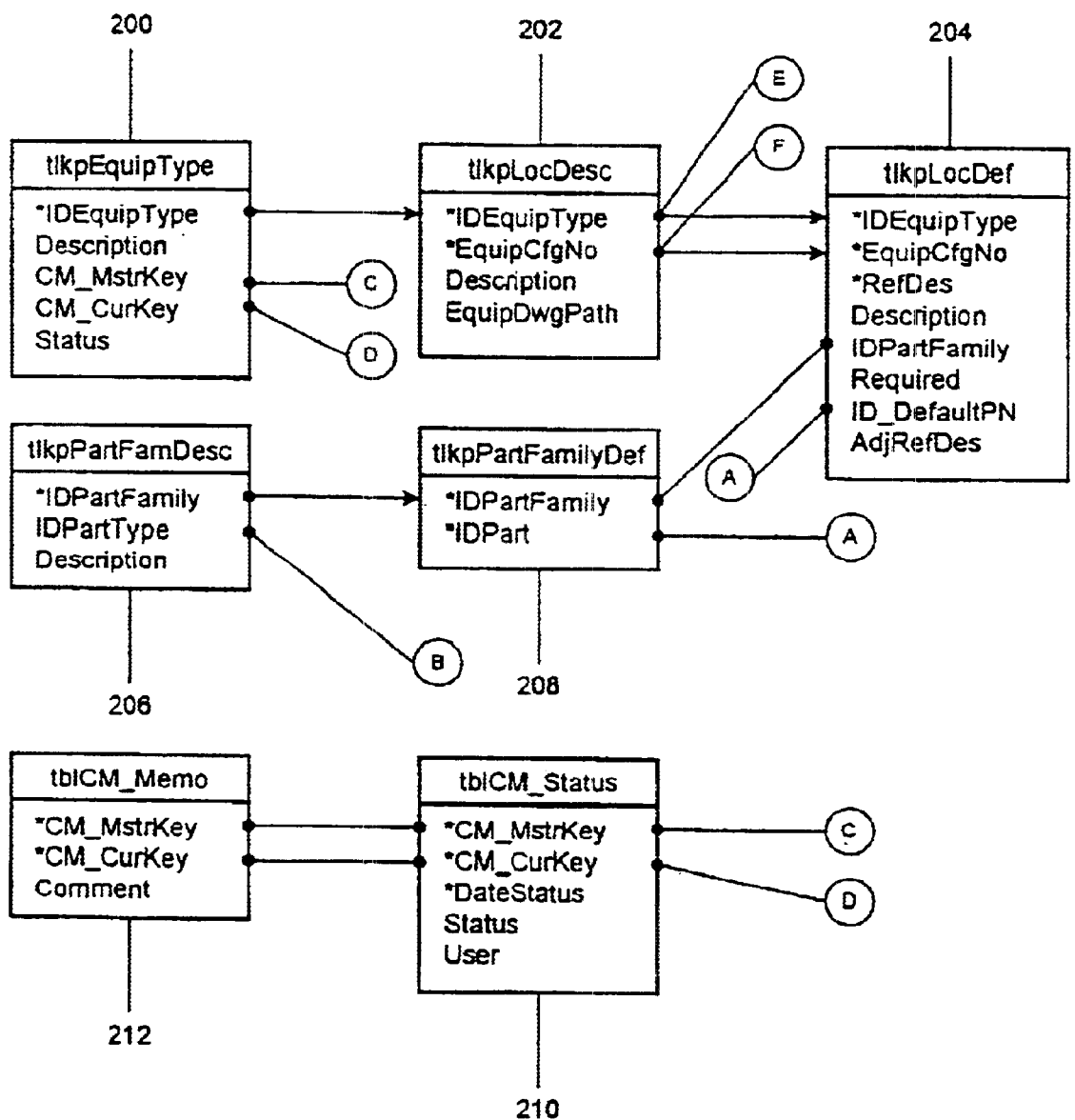
Figure 3:
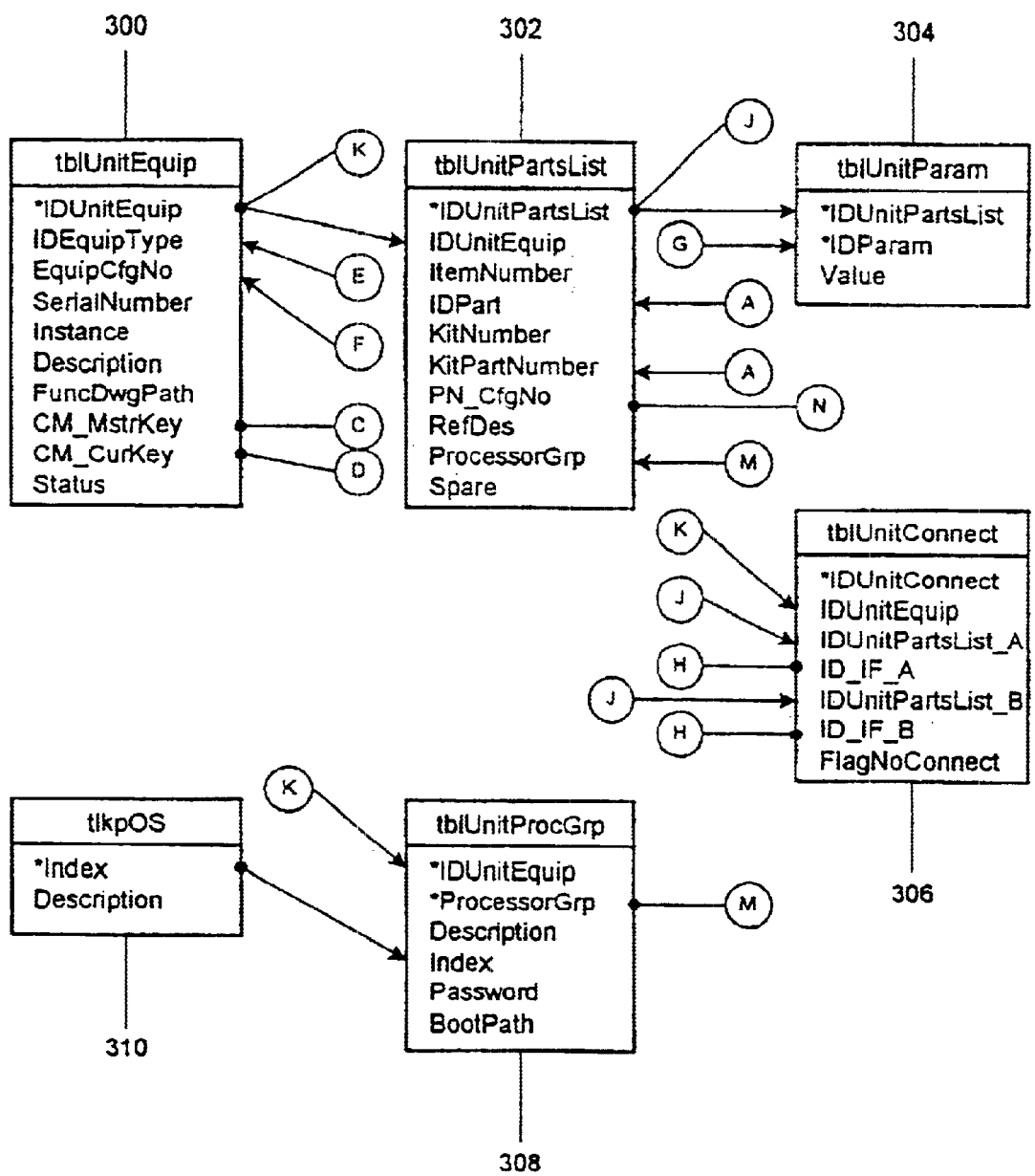
Figure 4:
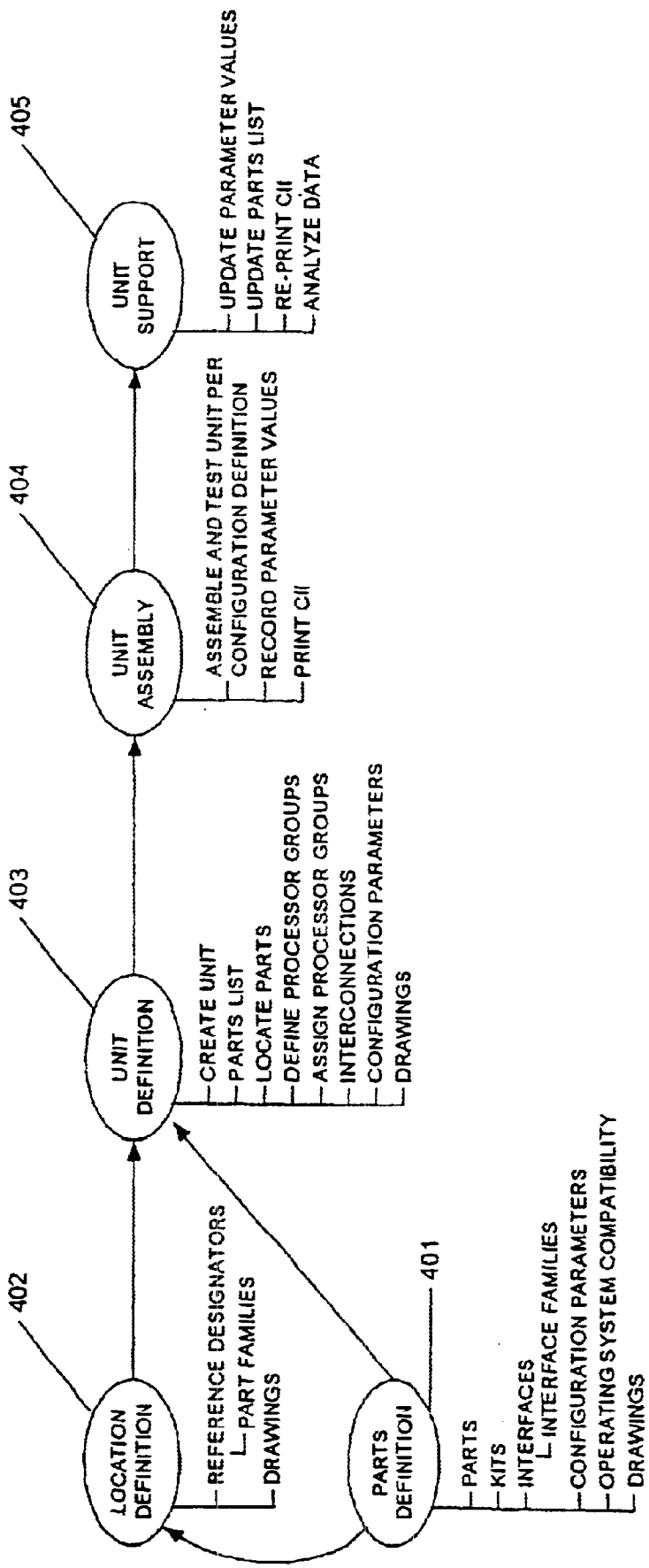
FIG. 4 is a diagram that illustrates key elements of the process for the definition of parts, locations and units and of the process for unit assembly and unit support.

The embodiment will be presented in the order of the Figures. The Figures show the relational database schema for the part definition, location definition and unit definition respectively. The Figures also show the process for operation of a user interface to the database tables. The description of the process will show how the features of the table schema are used to achieve the intended purpose. The process will not be described in terms of any specific implementation of a user interface since such a user interface will be readily apparent to one skilled in the art. The primary output report of the embodiment will be described.

Data lookup table tlkpPartType 100 is used to categorize parts and provide control flags that determine which features of the database may or may not apply to each part category. Table I defines the fields of tlkpPartType.

TABLE I

Fields of Table tlkpPartType

| Field Name | Field Type | Field Description |
|---|---|---|
| *IDPartType | Counter | A unique key for each part type. |
| Description | Text | A description of the part type. Typical values might include, Power System, Enclosure, Storage, Processor, Cable, HMI, kit, etc. |
| FlagLoc | Yes/No | Indicates whether the part type may be assigned to pre-defined location. Cables would normally not be assigned a location since they span locations. |
| FlagIF | Yes/No | Indicates whether the part type may have an interface assigned to it. Parts such as software would not have a physical interface. |
| FlagSize | Yes/No | Indicates whether the part type supports variable size. Certain types of parts may vary in size such as the number of slots for modular circuit cards that plug into a rack. |

*A counter field type is one where an index number is increased by one count for each new record.

Data lookup table tlkpPartsList 102 is used to contain the complete list of available parts or subassemblies to be later constructed into assemblies or systems called units. A typical part has a part number and description. Parts are categorized by part type. Of special interest is the size field. Situations may occur requiring population of multiple parts into a single location or a single part into multiple locations. A size of one or more will indicate the part takes one or more consecutive locations. A size of zero indicates a part can be added to populated location without requiring additional space. For example, a mezzanine module on a circuit card assembly or a software component added to a mass storage device. This table also uses the OS_Supported field to identify a compatibility matrix for operating systems with each part. This is used in the unit definition to assign parts to processor groups when multiple processors with varying operating systems are used within the system. A set of fields are also provided for configuration management control of part definitions. When a part is "Released", its definition is protected from further modification. When the part is not "Released", its definition is modifiable, but a record of the explanation for the change is maintained. Table II defines the fields of tlkpPartsList 102.

TABLE II

Fields of Table tlkpPartsList

| Field Name | Field Type | Field Description |
|---|---|---|
| *IDPart | Counter | A unique key for each part. |
| PartNumber | Text | A unique part number to identify each part. |
| Description | Text | A description of the part. |
| IDPartType | Long Integer | Selected from tlkpPartType 100 to identify the type of the part. |
| Size | Integer | Indicates the number of locations the part requires. |
| DefaultRefDes | Text | Used to define the default reference designator for cables. Since cables are not assigned locations, the have either fixed or variable designations. This is the fixed designation. A variable designation is assigned when the unit is constructed. Alphanumeric reference designators need to be represented with fixed length numeric strings in order to sort properly (e.g. A001, A010). |
| OS_Supported | Text | A character string where each position corresponds to a specific type of operating system. A "Y" at the character position indicates the operating system is supported by the part. A "N" at the character position indicates the operation system is not supported by the part. |
| CM_MstrKey | Long Integer | Link to tblCM_Status 210 and tblCM_Memo 212 defining the group of configuration management records for a part. |
| CM_CurKey | Long Integer | Link to tblCM_Status 210 and tblCM_Memo 212 defining the current configuration management records for a part. |
| Status | Long Integer | The current configuration status. Either "Released", "Unreleased" or "In Process". Released is used to write protect the part definition. |

Data lookup table tlkpKitDef 104 is used to group parts into kits. A kits of parts is useful for more quickly assembling a parts list when multiple parts are always used together. Table III defines the fields of tlkpKitDef 104.

TABLE III

Fields of Table tlkpKitDef

| Field Name | Field Type | Field Description |
|---|---|---|
| IDKitPN | Long Integer | A link to tlkpPartsList 102 for a part of part type kit. This record is added when a kit type part is created. |
| IDPart | Long Integer | Selected from tlkpPartsList 102 to add parts to a kit. |
| Qty | Integer | The quantity of part within a kit. |

Data lookup table tlkpIF_Def 106 is used in conjunction with tlkpIF_Family 108 and tlkpTagDef to define the interfaces of a part. A part has one set of defined interfaces that are used to connect to other parts. To simplify the process of interconnecting parts, interfaces are grouped into interface families. An interface family is a collection of interfaces that are functionally and mechanically compatible with each other. Interface families are grouped into the part types to help organize them because there may be very many different interface families. An interface includes gender plugs or jacks. Two interfaces are compatible when they share the same interface family and opposite gender. Additionally, each interface of a cable may have a tag associated with it. The cable tag is added to the cable interface end and is marked with the name of the interface, the cable reference designator, and the reference designator and interface name of the destination or mate of the cable end. This type of marking insures proper assembly and operation of the system. Table IV defines the fields of tlkpIF_Def. Table V defines the fields of tlkpIF_Family. Table VI defines the field of tlkpTagDef.

TABLE IV

Fields of Table tlkpIF_Def

| Field Name | Field Type | Field Description |
|---|---|---|
| *ID_IF | Counter | A unique key for each interface. |
| IDPart | Long Integer | A link to tlkpPartsList 102 to correlate an interface to a part. |
| ID_IF_Family | Long Integer | Selected from tlkpIF_Family 108 to define the interface family for the interface. |
| Name | Text | A name for the interface. |
| Description | Text | A description of the function of the interface. |
| Gender | Text | The value Plug or Jack. |
| ID_Tag | Long Integer | Selected from tlkpTagDef 110 to correlate an interface to the tag used to mark the interface with its name and destination. |

TABLE V

Fields of Table tlkpIF_Family

| Field Name | Field Type | Field Description |
|---|---|---|
| *ID_IF_Family | Counter | A unique key for each interface family. |
| IDPartType | Long Integer | Selected from tlkpPartType 100 to group an interface family into a part type. |
| Description | Text | A description of the interface family. |

TABLE VI

Fields of Table tlkpTagDef

| Field Name | Field Type | Field Description |
|---|---|---|
| *ID_Tag | Counter | A unique key for each cable Tag. |
| TagPN | Text | A part number of a tag. Used to group all markings on the same tags when printing the tags in a factory. |
| Description | Text | A description of the use of the tag. |

Data lookup table tlkpParamDef 118 is used in conjunction with tlkpParamDesc 116 to define multiple sets of general purpose configuration parameters for a part. Multiple sets of configuration parameters are defined for parts that have more than one pre-definable configuration. The configuration parameter list for a part pre-defines the information deemed important about a part. In some cases the default value of a parameter may be defined. In other cases, only the parameter is defined and the value is left blank for assignment of a value during construction of a unit. In some cases, an illustration of the part is used to simplify the configuration of part in by showing the location and settings of variable switches, and the like.

The data lookup tables tlkpParamList 112 and tlkpParamGrp 114 provide a list of pre-defined and reusable parameters. Reusable parameters are necessary to support clarity of the collected data and to support searching and sorting of the data. Parameters are categorized into parameter groups to help organize the parameters and facilitate grouping when printing reports. Typical groups of parameters may include revision identification information such as serial numbers, weight, power requirements, switch settings, firmware settings, networking information, etc.

Table VII defines the fields of tlkpParamList 112. Table VIII defines the fields of tlkpParamGrp 114. Table IX defines the fields of tlkpParamDesc 116. Table X defines the fields of tlkpParamDef 118.

TABLE VII

Fields of Table tlkpParamList

| Field Name | Field Type | Field Description |
|---|---|---|
| *IDParam | Counter | A unique key for each parameter. |
| Description | Text | A description of the parameter. |
| IDParamGrp | Long Integer | Selected from tlkpParamGrp 114 to assign the parameter to parameter group. |
| HelpNotes | Text | Amplifying data entered to describe the use of the parameter. |
| FlagCopy | Yes/No | A flag indicating whether the parameter value is cleared when one unit is copied to a different unit. Used for information such as subassembly serial numbers that are unique to each unit. |

TABLE VIII

Fields of Table tlkpParamGrp

| Field Name | Field Type | Field Description |
|---|---|---|
| *IDParamGrp | Counter | A unique key for each parameter group. |
| LongDescription | Text | A long form of the description of the parameter group. Used for printing reports. |

TABLE VIII-continued

Fields of Table tlkpParamGrp

| Field Name | Field Type | Field Description |
| --- | --- | --- |
| ShortDescription | Text | A short form of the description of the parameter group. Used on input forms to save space. |

TABLE IX

Fields of Table tlkpParamDesc

| Field Name | Field Type | Field Description |
| --- | --- | --- |
| *IDPart | Long Integer | A link to tlkpPartsList 102 to correlate a parameter set to a part. |
| *PN_CfgNo | Integer | A number to uniquely identify the set of configuration parameters. |
| Description | Text | A description of the set of configuration parameters. |
| LRU_DwgPath | Text | The name of a file or set of files containing the illustration of the particular configuration of the part. |

TABLE X

Fields of Table tlkpParamDef

| Field Name | Field Type | Field Description |
| --- | --- | --- |
| *IDPart | Long Integer | A link to tlkpPartsList 102 to correlate a parameter set to a part. |
| *PN_CfgNo | Integer | A link to tlkpParamDesc 116 to identify the set of configuration parameters. |
| *IDParam | Long Integer | Selected from tlkpParamDesc 116 to define a parameter. |
| DefaultValue | Text | The default value of the parameter or blank if the parameter value is determined when the unit is constructed. |

Data lookup table tlkpEquipType 200 combined with tlkpLocDesc 202 and tlkpLocDef 204 defines a type of equipment and the locations within the equipment that fixed subassemblies (not cables) may be placed. Multiple sets of location definitions are supported for an equipment when necessary. An illustration may be associated with a location definition to illustrate the location definition in printed reports. This illustration should have callouts identifying the reference designated locations for subassemblies. A set of fields are also provided for configuration management control of location definitions. When a location definition is "Released", its definition is protected from further modification. When the location definition is not "Released", its definition is modifiable, but a record of the explanation for the change is maintained.

In order to sort alpha-numeric reference designators properly, they must be represented with fixed length numeric strings (e.g., A001, A002, A010 vs. A1, A10, A2.) Part families are used to control the assignment of subassemblies to locations in which subassemblies are compatible. In order to sort alpha-numeric reference designators properly, they must be represented with fixed length numeric strings (e.g. A001, A002, A010 vs. A1, A10, A2). Data lookup tables tlkpPartFamilyDef 208 and tlkpPartFamDesc 206 define the list of parts that make up a part family. A part family is then assigned to a location in tlkpLocDef 204. Table XI defines the fields of tlkpEquipType 200. Table XII defines the fields of tlkpLocDesc 202. Table XIII defines the fields of tlkpLocDef Table XIV defines the fields of tlkpPartFamDesc 206. Table XV defines the fields of tlkpPartFamilyDef 208.

TABLE XI

Fields of Table tlkpEquipType

| Field Name | Field Type | Field Description |
| --- | --- | --- |
| *IDEquipType | Counter | A unique identifier of an equipment type. |
| Description | Text | A description of the equipment. |
| CM_MstrKey | Long Integer | Link to tblCM_Status 210 and tblCM_Memo 212 defining the group of configuration management records for an equipment. |
| CM_CurKey | Long Integer | Link to tblCM_Status 210 and tblCM_Memo 212 defining the current configuration management records for an equipment. |
| Status | Long Integer | The current configuration status. Either "Released", "Unreleased" or "In Process". Released is used to write protect the location definition. |

TABLE XII

Fields of Table tlkpLocDesc

| Field Name | Field Type | Field Description |
| --- | --- | --- |
| *IDEquipType | Long Integer | Selected from tlkpEquipType 200 defining the equipment type associated with the location definition. |
| *EquipCfgNo | Integer | A number to uniquely identify a set of location definitions. |
| Description | Text | A description of the location definition. |
| EquipDwgPath | Text | The name of a file or set of files containing the illustration of the particular location definition of the equipment. |

TABLE XIII

Fields of Table tlkpLocDef

| Field Name | Field Type | Field Description |
| --- | --- | --- |
| *IDEquipType | Long Integer | Link to tlkpLocDesc 202 defining the equipment type associated with the location definition. |
| *EquipCfgNo | Integer | Link to tlkpLocDesc 202 to identify a set of location definitions. |
| *RefDes | Text | A unique location within the equipment. Alpha-numeric reference designators need to be represented with fixed length numeric strings in order to sort properly (e.g. A001, A010). |
| Description | Text | A description of the location definition. |
| IDPartFamily | Long Integer | Selected from tlkpPartFamilyDef 208 defining the part family compatible with the location. |
| Required | Yes/No | A flag indicating whether the location is required to be populated. Used for error checking. |
| ID_DefaultPN | Long Integer | Selected from tlkpPartsList 102 to identify a part such as a cover. Should be used to fill a location when no other part has been assigned to the location. Expedites |

TABLE XIII-continued

Fields of Table tlkpLocDef

| Field Name | Field Type | Field Description |
|---|---|---|
| | | filling required locations with a default part. |
| AdjRefDes | Text | The reference designator of an adjacent location that may be used for parts with a size greater than one. Alpha-numeric reference designators need to be represented with fixed length numeric strings in order to sort properly (e.g. A001, A010). |

TABLE XIV

Fields of Table tlkpPartFamDesc

| Field Name | Field Type | Field Description |
|---|---|---|
| *IDPartFamily | Counter | A unique identifier for a part family. |
| IDPartType | Long Integer | Selected from tlkpPartType 100 to categorize a part family by a part type. |
| Description | Text | A description of the part family. |

TABLE XV

Fields of Table tlkpPartFamilyDef

| Field Name | Field Type | Field Description |
|---|---|---|
| *IDPartFamily | Long Integer | A link to tlkpPartFamDesc 206 to define a part family for a list of parts. |
| *IDPart | Long Integer | Selected from tlkpPartsList 102 to define a list of parts in a part family. |

Data lookup tables tblCM_Memo 212 and tblCM_Status 210 are used to record an explanation of changes that occur to definitions of parts, locations, or assembled units. A unique master key is assigned to each part, location definition, or unit definition defining the group of records related to it. The current key identifies the most recent comment record. A new record is added when the status changes to "Released" and no records currently exist in the tables. After this initial record is created, a new record is created each time the status changes from "Released". The time, date and identity of the user are also recorded. Table XVI defines the fields for tblCM_Memo 212. Table XVII defines the fields for tblCM_Status 210.

TABLE XVI

Fields of Table tblCM_Memo

| Field Name | Field Type | Field Description |
|---|---|---|
| *CM_MstrKey | Long Integer | Link to tblCM_Status 210 defining the group of configuration management records for a part definition, location definition or unit definition. |
| *CM_CurKey | Long Integer | Link to tblCM_Status 210 defining the current configuration management records for a part definition, location definition or unit definition. |
| Comment | Text | A description recorded to justify the change. |

TABLE XVII

Fields of Table tblCM_Status

| Field Name | Field Type | Field Description |
|---|---|---|
| *CM_MstrKey | Long Integer | Link to tblCM_Memo 212 defining the group of configuration management records for a part definition, location definition or unit definition. |
| *CM_CurKey | Long Integer | Link to tblCM_Memo 212 defining the current configuration management records for a part definition, location definition or unit definition. |
| *DateStatus | Date | The date and time of the last status change. |
| Status | Text | The current configuration status. Either "Released", "Unreleased" or "In Process". Released is used to write protect the part definition, location definition or unit definition. |
| User | Text | The name of the user responsible for making the change. |

Unit definition data table tblUnitEquip 300 defines a unique system or assembly. A unit is identified by the combination of fields IDEquipType, SerialNumber and Instance. The IDEquipType field identifies the type of equipment to be assembled. The SerialNumber field identifies a unique piece of equipment. The Instance field further identifies a different version of a SerialNumber equipment if so desired. The EquipCfgNo field is selected from the corresponding field in data lookup table tlkpLocDesc 202 to select a specific location definition for the selected equipment type. An illustration may be associated with a Unit definition which can provide a functional block diagram of the system in printed reports. The functional block diagram enhances the understanding of the tabular data provided by the database without being too detailed or costly to produce. A set of fields are also provided for configuration management control of the unit definition. When a unit definition is "Released", its definition is protected from further modification. When the unit definition is not "Released", its definition is modifiable, but a record of the explanation for the change is maintained. Table XVIII defines the fields for tblUnitEquip 300.

TABLE XVIII

Fields of Table tblUnitEquip

| Field Name | Field Type | Field Description |
|---|---|---|
| *IDUnitEquip | Counter | A unique identifier of the unit. |
| IDEquipType | Long Integer | Selected from tlkpLocDesc 202 to select an equipment location definition. |
| EquipCfgNo | Integer | Selected from tlkpLocDesc 202 to identify a set of location definitions. |
| SerialNumber | Text | A serial number for a specific unit. |

TABLE XVIII-continued

Fields of Table tblUnitEquip

| Field Name | Field Type | Field Description |
|---|---|---|
| Instance | Text | Any text describing a different version of the same SerialNumber unit. |
| Description | Text | A description of the unit. |
| FuncDwgPath | Text | The name of a file or set of files containing the illustration of the functional block diagram for the unit. |
| CM_MstrKey | Long Integer | Link to tblCM_Status 210 and tblCM_Memo 212 defining the group of configuration management records for a unit. |
| CM_CurKey | Long Integer | Link to tblCM_Status 210 and tblCM_Memo 212 defining the current configuration management records for an unit. |
| Status | Long Integer | The current configuration status. Either "Released", "Unreleased" or "In Process". Released is used to write protect the unit definition. |

Unit definition data table tblUnitPartsList 302 contains a list of parts selected from tlkpPartsList 102. Parts may be added to the list in groups by selecting kits from data lookup table tlkpKitdef 104. Each part is added to the parts list of the unit assuming quantity one for each. This is necessary for each part to be uniquely configured and connected to other parts in the assembly. Only the IDPart field of a part from tlkpPartsList is added to the parts list table since the definition of the part is always available from the part definition lookup tables. When a part is added to the parts list, it is assigned the next sequential item number in the Item:Number field to uniquely identity the part. When a kit is added to the parts list, each part in the kit is assigned the next sequential kit item number in field KitNumber. The KitNumber field maintains a grouping of all parts added from each kit. The KitPartNumber field preserves a link to the part number of the kit for reference. The PN_CfgNo field is selected from the corresponding field in data lookup table tlkpParamdesc 116 to select a specific set of configuration parameters for a part and it is also used as a link to get to the LRU_DwgPath field. The RefDes field is selected from the data lookup table tlkpLocDef 204. The ProcessorGrp field is used to combine parts that all need to be grouped under a single computer operating system. This is useful for multi-processor systems. The ProcessorGrp field is selected from unit definition data table tblUnitProcGrp 308. The Spare field is used to designate a part that is not configured within the unit, such as a spare shipped separately. Table XIX defines the fields of tblUnitPartsList 302.

TABLE XIX

Fields of Table tblUnitPartsList

| Field Name | Field Type | Field Description |
|---|---|---|
| *IDUnitPartsList | Counter | A unique identifier of a part. |
| IDUnitEquip | Long Integer | A link to tblUnitEquip 300 to assign the part to a unit. |
| ItemNumber | Integer | A sequential number unique to each part within a unit. |
| IDPart | Long Integer | Selected from tlkpPartsList 102 to link to all other tables using IDPart to supply part definition information from the lookup tables. |

TABLE XIX-continued

Fields of Table tblUnitPartsList

| Field Name | Field Type | Field Description |
|---|---|---|
| KitNumber | Integer | A sequential number unique to each kit and assigned to all the parts in each kit. |
| KitPartNumber | Long Integer | Selected from kit part types within tlkpPartsList 102 to define the kit part number. |
| PN_CfgNo | Integer | Selected from tlkpParamDesc 116 to link also to tlkpParamDef 118 to identify a set of configuration parameters for each part within the unit. |
| RefDes | Text | A reference designator selected from tlkpLocDef 204 or manually entered for parts such as cables that do not have a fixed location. Alphanumeric reference designators need to be represented with fixed length numeric strings in order to sort properly (e.g. A001, A010). |
| ProcessorGrp | Integer | The number of a processor group selected from tblUnitProcGrp 308. |
| Spare | Yes/No | A flag indicating whether a part is to be configured within the unit or kept separate. |

Unit definition data table tblUnitParam 304 defines the list of parameters associated with a part in tblUnitPartsList. When a particular configuration of a part is selected from tlkpParamDesc 116 associated with field PN_CfgNo, the corresponding records from tlkpParamDef 118 are copied into tblUnitParam 304. This copy is performed to allow changing any of the parameter values unique to a part without affecting the default values intlkpParamDef 118. Table XX defines the fields of tblUnitParam 304.

TABLE XX

Fields of Table tblUnitParam

| Field Name | Field Type | Field Description |
|---|---|---|
| *IDUnitPartsList | Counter | A unique identifier of a part. |
| *IDParam | Long Integer | A link to tlkpParamDef 118 to define the parameter. |
| Value | Text | The value of a parameter. |

Unit definition table tblUnitConnect 306 defines all connections between interfaces within the unit. All unconnected (no connect) interfaces are also recorded. When all interfaces are accounted for within tblUnitConnect, the connection process is verifiably completed. Each connection has a unique fieldIDUnitConnect which is necessary for deleting connections from the table. The use of field IDUnitEquip also allows enhanced performance by grouping records associated with the unit under construction. Connections are established by identifying the IDUniPartsList from tblUnitPartsList 302 value of a part and an interface, ID_IF from tlkpIF_Def 106 associated with the part. A mate is selected based upon the following criteria. The interface must be in the same unit, not previously assigned, not on a spare part, in the same interface family (field ID_IF_Family in tlkpIF_Def 106), and of opposite gender. If a mate is not selected, then the field FlagNoConnect may be set with the interface. It does not matter whether an interface is assigned to the _A fields or the _B fields. Table XXI defines the fields of tblUnitConnect 306.

TABLE XXI

Fields of Table tblUnitConnect

| Field Name | Field Type | Field Description |
|---|---|---|
| *IDUnitConnect | Counter | A unique identifier of a connection |
| IDUnitEquip | Long Integer | A link to tblUnitEquip 300 to group the connections within a unit. |
| IDUnitPartsList_A | Long Integer | A link to tblUnitPartsList 302 to identify a part. |
| ID_IF_A | Long Integer | A link to tlkpIF_Def 106 to identify an interface of the part IDUnitPartsList_A |
| IDUnitPartsList_B | Long Integer | A link to tblUnitPartsList 302 to identify a part. |
| ID_IF_B | Long Integer | A link to tlkpIF_Def 106 to identify an interface of the part IDUnitPartsList_B |
| FlagNoConnect | Yes/No | Indicates that the interface in either the _A fields or the _B fields is not connected to a mate. This method is probably faster than detecting the undefined values in the mating fields. |

Unit definition table tblUnitProGrp 308 is used in conjunction with tlkpOS 310 to define a processor group and assign the processor group to an operating system. The processor group is then used to select the processor group for parts in tblUnitPartsList 302. A processor group is a collection of parts that operate under a single operating system. This would include parts such as processors, mass storage devices, HMI devices and software. This grouping is helpful in systems with multiple processors and operating systems to insure operating system compatibility of parts.

Data lookup table tlkpOS 310 contains an index which is a sequential number and a description corresponding to an operating system. The index is used as a character array index into field OS_Supported of tlkpPartsList 102. The treatment of field OS_Supported as an array allows for a varying number of operating systems without affecting the design of the database. If the character at the indexed position of field OS_Supported is a "Y", then the operating system is supported, otherwise it is not. When a part in tblUnitPartsList is assigned a processor group, the OS_Supported field of the part is verified to support the operating system assigned to the processor group. Additional parameters are provided in tblUnitProcGrp 308 to further define the configuration of the processor group. Table XXII defines the fields of tblUnitProcGrp 308. Table XXIII defines the fields of tlkpOS 310.

TABLE XXII

Fields of Table tblUnitProcGrp

| Field Name | Field Type | Field Description |
|---|---|---|
| *IDUnitEquip | Long Integer | A link to tblUnitEquip 300 to group the connections within a unit. |
| *ProcessorGrp | Integer | A sequential number for each processor group within a unit. |
| Description | Text | The description of the processor group |
| Index | Integer | Selected from tlkpOS to correspond the processor group to an operating system. |
| Password | Text | The login password for the default login name. |
| BootPath | Text | A text string indicating the source of the operating system the executes on the processor group. For example, the operating system may be loaded from a local mass storage device or over a local area network from a remote mass storage device. |

TABLE XXIII

Fields of Table tlkpOS

| Field Name | Field Type | Field Description |
|---|---|---|
| *Index | Integer | A unique identifier of a operating system. Used as in index into the array in field OS_Support in tlkpPartsList 102. |
| Description | Text | A description of the operating system. |

The process for manipulating data in the relational database tables will be described assuming a hierarchical set of actions which is typical of an event driven graphical user interface. The following tables have a column identifying the level of hierarchy for an action using an outline numbering scheme, a brief description of the action and additional explanation about the action if necessary to fully describe the action. Table XXIV defines the top level process. Major steps in the process will be decomposed in subsequent tables.

TABLE XXIV

Actions of Main Menu

| Level | Description | Additional Explanation |
|---|---|---|
| 1 | Part Definition | The parts definition process (Table XXV). |
| 2 | Location Definition | The location definition process (Table XXVII). |
| 3 | Unit Definition | The unit definition process (Table XXVIII). |
| 4 | Maintenance | Maintenance of other tables (Table XXXI). |

The part definition process involves the creation of database records to define the configuration information for parts. The definition process begins with the creation of the part, and continues with the addition of parameter definitions and interface definitions. Parts defined as kits will not have parameter definitions or interface definitions. To edit field OS_Supported in tlkpPartsList 102, use tlkpOS to index into the OS_Supported array and toggle the character for each operating system between "Y" and "N". For certain parts that add on to other parts without taking extra space, set the Size field in tlkpPartsList 102 to zero. The field DefaultRefDes in tlkpPartsList 102 is only used for cables with a fixed reference designator assignment. When the part is initially created, the Status field is set as In-Process. When the part definition process for a part is completed, the status is set to Released. Further modifications of the part definition will require changing the status back to In-Process and recording an explanation for the change. Table XXV defines the part definition process.

TABLE XXV

Actions of Part Definition

| Level | Description | Additional Explanation |
|---|---|---|
| 1.1 | View Parts List | Display the list of parts from tlkpPartList 102. |
| 1.1.1 | Add Part | Add new record to tlkpPartsList 102. |
| 1.1.2 | Delete Selected Part | Delete part from tlkpPartsList 102 and related data from tlkpParamDesc 116, tlkpParamDef 118, tlkpIF_Def 106, tlkpPartFamilyDef 208 and tlkpKitDef. A part cannot be deleted if used in any unit definition. |
| 1.1.3 | Copy Selected Part to New Part | Copy all of the data defining a part (configurations, interfaces and part families as in 1.1.2) to a new part. |
| 1.1.4 | Edit Selected Part Description | Change the values of fields in tlkpPartsList 102 except field PartNumber. |
| 1.1.5 | Edit Selected Part Parameters | Edit parameter definitions (Table XXVI). |
| 1.1.6 | Edit Selected Part Interfaces | Edit interface definitions (Table XXVII). |
| 1.1.7 | Status Selected Part | Change configuration status of selected part. |
| 1.2 | View Kit List | Displays all parts of part type Kit |
| 1.2.1 | Add Kit Part | Adds a new record to tlkpKitDef 104 to add a part to a kit. |
| 1.2.2 | Delete Kit Part | Delete a part from tlkpKitDef 104. |

The parameter definition subprocess within the part definition process allows for the creation of multiple sets, or configurations, of parameters for a part. The parameter definition lookup table structure is a general purpose method to define arbitrary information about a part. Parameters are created to be reusable on all parts so that queries may be written to extract desirable information. Parameters are also created as members of parameter groups to help organize the parameters. The values assigned at this point are default values since parameters and values are copied from the selected configuration when configuring a unit. The field FlagCopy in tlkpParamList indicates that a parameter value, such as a subassembly serial number, must be cleared when one unit is copied to another. To save space within the database, the name of an illustration file or set of files (using wildcards) may be used in field LRU_DwgPath in tlkpParamDesc 116. The file or files can be temporarily brought into the database during printing operations. The HelpNotes field of tlkpParamList 112 provides direction to the user on the meaning of the parameter and its possible values. Parameters may include information such as weight and power consumption which can be calculated with additional queries. Table XXVI defines the parameter definition subprocess of the part definition process.

TABLE XXVI

Actions of Parameter Definition

| Level | Description | Additional Explanation |
|---|---|---|
| 1.1.5.1 | Add Configuration | Add a new record to tlkpParamDesc 116. |
| 1.1.5.2 | Delete Configuration | Delete record in tlkpParamDesc 116 and related parameters in tlkpParamDef 118. Configuration cannot be deleted if used in unit definition. |
| 1.1.5.3 | Copy Configuration | Add a new record to tlkpParamDesc 116 with next PN_CfgNo and copy parameters in tlkpParamDef 118 to new PN_CfgNo. |
| 1.1.5.4 | Edit Configuration | Edit parameters of selected PN_CfgNo from tlkpParamDesc 116. |
| 1.1.5.4.1 | Add Parameter | Add new parameter selected from tlkpParamList 112 to tlkpParamDef 118. |
| 1.1.5.4.1.1 | Create Parameter | Add new parameter definition to tlkpParamList 112. Field IDParamGrp selected from tlkpParamGrp 114. |
| 1.1.5.4.2 | Delete Parameter | Delete parameter from tlkpParamDef 118. Parameters cannot be deleted if used in unit definition. |
| 1.1.5.4.3 | Edit Parameter | Edit field DefaultValue in tlkpParamDef 118. |

The interface definition subprocess of the part definition process allows for the creation of a list of interfaces for connection of the corresponding part to others parts. In a large system, the number of types of interfaces is large so the interfaces need to be organized. Interface families are used to categorize interfaces into functionally and mechanically compatible groups. Additionally, the number of interface families may be large so the interface families are also grouped into categories of part types. As a general rule, the part type of an interface family should be based on the more fixed type of connector (not cable interfaces). An interface is assigned to an interface family and given a gender. The gender, plug or jack, is used to allow interfaces within the same interface family to mate when constructing a unit. As a general rule, the more fixed type of connector is defined as a Jack and more flexible connectors are defined as Plugs (cable interfaces). If a cable interface may be connected to a variety of mates, a cable tag may be assigned to the interface which can be marked with information defining the connection (source and destination). For example, if cable W100 interface P1 connects to subassembly A1A2 J2, the marker is "W100 P1 (A1A2 J2)". The parentheses indicate the destination of the cable interface. Table XXVII defines the interface definition subprocess of the part definition process.

TABLE XXVII

Actions of Interface Definition

| Level | Description | Additional Explanation |
|---|---|---|
| 1.1.6.1 | Add Interface | Add a new record to tlkpIF_Def 106. Field ID_IF_Family selected from tlkpIF_Family 108. Field ID_Tag selected from tlkpTagDef 110. Select field Gender from "Plug" or "Jack". |
| 1.1.6.1.1 | Add Interface Family | Add a new record to tlkpIF_Family 108. Field IDPartType selected from tlkpPartType 100. |
| 1.1.6.2 | Delete Interface | Delete record from tlkpIF_Def 106. Cannot be deleted if used in unit definition. |

The location definition process is used to create a type of equipment or system and assign location definitions to it. Multiple sets of location definitions may be required for some types of equipment or systems. A location definition is a list of reference designated locations corresponding to places within the equipment or system for fixed subassemblies. This does not include cables used to connect the subassemblies. In some cases, the location definition may be augmented with an illustration implemented as a file or set of files identified by the field EquipDwgPath of tlkpLocDesc 202. Part families are used to insure that only parts compatible with a location are later assigned to that location during the unit construction process. A part family is a list of parts compatible with location. Since parts are categorized into part types, so are part families. When the equipment is initially created, the Status field is set as In-Process. When the location definition process for an equipment is completed, the status is set to Released. Further modifications of the location definition will require changing the status back to In-Process and recording an explanation for the change. Table XXVIII defines the location definition process.

TABLE XXVIII

Actions of Location Definition

| Level | Description | Additional Explanation |
|---|---|---|
| 2.1 | Add Equipment Type | Add a new record to tlkpEquipType to create a type of equipment. |
| 2.1.1 | Add Configuration | Add a new record to tlkpLocDesc 202. |
| 2.1.2 | Delete Configuration | Delete record in tlkpLocDesc 202 and related records in tlkpLocDef 204. Configuration cannot be deleted if used in unit definition. |
| 2.1.3 | Copy Configuration | Add a new record to tlkpLocDesc 202 with next EquipCfgNo and copy records in tlkpLocDef 204 to new EquipCfgNo. |
| 2.1.4 | Edit Configuration | Edit locations of selected EquipCfgNo from tlkpLocDesc 202. |
| 2.1.4.1 | Add Location | Add new location to tlkpLocDef 204. Select field IDPartFamily from tlkpPartFamilyDesc 206. Adjust reference designator to use fixed length numeric fields (e.g. A001). |
| 2.1.4.1.1 | Create Part Family | Add new part family definition to tlkpPartFamilyDesc 206. |
| 2.1.4.2 | Delete Location | Delete location from tlkpLocDef 204. Location cannot be deleted if used in unit definition. |
| 2.1.4.3 | Add Part to Part Family | Add new part to a part family in tlkpPartFamilyDef 208. Select part family from tlkpPartFamDesc 206. |
| 2.1.4.4 | Delete Part from Part Family | Delete part from a part family in tlkpPartFamilyDef 208. Select part family from tlkpPartFamDesc 206. |
| 2.2 | Status Selected Equipment | Change configuration status of selected equipment. |

The unit definition process results in a description of the construction of a unit assembly or system. A unit is made of parts selected from the parts definition tables. The parts are assigned to locations according to the part family definitions of the location definition of the selected equipment type. Processor groups may be defined and parts assigned to them. The parts are then interconnected based upon the interface definitions and interface families in the part definition. Finally, the parts are assigned configuration parameters based on the configuration parameter definitions in the part definition. The completed unit definition may be printed on reports to be described later. The unit definition is linked to the part definition and location definition for efficiency and coherency. When the unit is initially created, the Status field is set as In-Process. When the unit definition process for an equipment is completed, the status is set to Released. Further modifications of the unit definition will require changing the status back to In-Process and recording an explanation for the change. Table XXIX defines the unit definition process.

TABLE XXIX

Actions of Unit Definition

| Level | Description | Additional Explanation |
|---|---|---|
| 3.1 | Add Unit | Add a new record to tblUnitEquip 300 to create a unit for assembly. Select the IDEquipType from tlkpEquipType 200 and EquipCfgNo from tlkpLocDesc 202. |
| 3.2 | Edit Unit | Select a unit from tblUnitEquip 300. |
| 3.2.1 | Edit Parts List | View the unit parts list from tblUnitPartsList 302. |
| 3.2.1.1 | Add Part | Add a part from tlkpPartsList 102 to tblUnitPartsList 302. Use the next sequential item number starting at 1. If the part is a kit, add all the parts of the kit (multiply any quantities greater than 1) and use the next sequential kit number starting at 1. Copy the DefaultRefDes field from tlkpPartsList 102 to the RefDes field of tblUnitPartsList 302. |
| 3.2.1.2 | Delete Part | Delete a part from tlkpPartsList 102 and all corresponding records from tblParam 304 and tblUnitConnect 306. |
| 3.2.1.3 | Delete Kit | Delete all parts of a kit according to 3.2.1.2. |
| 3.2.2 | Assign Locations to Parts | Assign field RefDes in tblUnitPartsList 302 based on a part family compatible, unoccupied location from tlkpLocDef 204. Additional parts may be added to an occupied location of their size is zero (e.g. putting software on a hard disk). Spare parts are excluded from this step. Automatic assignments may be made for parts that have only one possible location. |
| 3.2.3 | Define Processor Groups | Add a record to tblUnitProcGrp 308 to define a processor group. Select field Index from tlkpOS 310. |
| 3.2.4 | Assign Processor Groups to Parts | Assign field ProcessorGrp in tblUnitPartsList 302 selected from tblUnitProcGrp 308. Insure that the OS_Supported field from tlkpPartsList allows the part to be assigned to the operating system based on field Index from tlkpOS 310. Spare parts are excluded from this step. |
| 3.2.5 | Interconnect Parts | Display the list of parts with interfaces, the interfaces and the connections to the interfaces (Table XXIX). Spare parts are excluded from this step. |
| 3.2.6 | Assign Parameters to Parts | Display the list of parts with configuration parameters and their parameters (Table XXXI). |
| 3.3 | Status Selected Unit | Change configuration status of selected unit. |
| 3.4 | Print Reports | Print a set of reports for a unit definition (Table TBD). |

The unit interconnection process is used to interconnect the parts in the unit that have interfaces defined. Mating interfaces are selected from the parts within the unit that have interfaces in the same interface family and opposite gender and are unconnected. To know when the interconnection subprocess is completed, all unconnected interfaces are defined explicitly as "No Connects" thus accounting for all interfaces within a unit. The field IDUnitConnect of tblUnitConnect 306 is necessary to delete records from the table. The field IDUnitEquip of tblUnitConnect accelerates queries for connections within a unit. Table XXX defines the unit interconnection subprocess of the unit definition process.

TABLE XXX

Actions of Unit Interconnect Definition

| Level | Description | Additional Explanation |
|---|---|---|
| 3.2.5.1 | Assign Cable Reference Designators | Assign values to cable reference designators since they are not assigned during location definition. |
| 3.2.5.2 | Auto-assign Connections and No Connections | Detect all interfaces that have only one possible mate or no possible mates and automatically assign them. |
| 3.2.5.3 | Assign Connection | Select a mate for an interface that is in the same interface family, opposite gender and unconnected and assign a connection in tblUnitConnect 306. |
| 3.2.5.4 | Assign No Connection | Assign a No Connect record in tblUnitConnect 306. |
| 3.2.5.5 | Delete Connection | Delete a record in tblUnitConnect 306. |

The unit parameter definition process is used to assign a specific set of configuration parameters to each part within a unit. The parameters from the selected configuration are copied to tblUnitParam 304 so that parameter values may be modified independent of the part definition. A link to the original parameters in maintained with field PN_CfgNo in tblUnitPartsList so that the description and illustration fields in tlkpParamDesc 116 may be used. Parts that have only one configuration may be automatically assigned. Table XXXI defines the unit parameter definition subprocess of the unit definition process.

TABLE XXXI

Actions of Unit Parameter Definition

| Level | Description | Additional Explanation |
|---|---|---|
| 3.2.6.1 | Auto-assign Configurations | Copy all parameters from tlkpParamDef 118 to tblUnitParam 304 for parts with only one configuration in tlkpParamDesc 116. Assign the PN_CfgNo field of tblUnitPartsList 302 to the value from tlkpParamDesc 116. |
| 3.2.6.2 | Select Configuration | Select a configuration from tlkpParamDesc 116 and copy all parameters from tlkpParamDef 118 to tblUnitParam 304. Assign the PN_CfgNo field of tblUnitPartsList 302 to the selected value from tlkpParamDesc 116. |
| 3.2.6.3 | Delete Configuration | Delete a configuration from tblUnitParam 304 and clear field PN_CfgNo in tblUnitPartsList 302. |
| 3.2.6.4 | Edit Configuration Values | Edit the values in tblUnitParam 304. |

The maintenance of supporting tables requires basic record operations. The supporting tables are not modified as part of normal activities and are considered more of an administration activity. Table XXXII defines the maintenance process.

TABLE XXXII

Actions of Maintenance

| Level | Description | Additional Explanation |
|---|---|---|
| 4.1 | Edit Part Type Definitions | Add, delete and edit part type definitions in tlkpPartType 100. |
| 4.2 | Edit Operating System Definitions | Add, delete and edit operating system definitions in tlkpOS 310. |
| 4.3 | Edit Parameter Group Definitions | Add, delete and edit parameter group definitions in tlkpParamGrp 114. |
| 4.4 | Edit Cable Tag Definitions | Add, delete and edit cable tag definitions in tlkpTagDef 110. |

The configuration management tables tblCM_Status 210 and tblCM_Memo 212 are used by the part definition process, the location definition process and the unit definition process to record explanations for changes in status. The status is used to secure records when the data is considered complete. When the first change in status occurs, no records will exist in the tables so an initial record is created. The initial record defines a new master key in field CM_MstrKey which assigns all records under this key the associated part, equipment or unit. The new master key is the next sequential value from the largest master key. A new current key is established in field CM_CurKey which identifies each separate explanation in field Comment. A new record is added and a new current key is established each time the status is change from Released to In-process. Each time the status changes, a new record is added to tblCM_status recording the date and time, the user and the status.

The primary printed reports that may be generated define the construction of a selected unit. This report could be called a configuration identification index (CII). Other reports may be generated to create a hard copy of part definitions or location definitions. The CII requires several chapters of reports for each topic to be printed. This document could also include title page and tables of contents. Table XXXIII defines a basic set of chapters for a CII.

TABLE XXXIII

Configuration Identification Index Report

Figure 6:
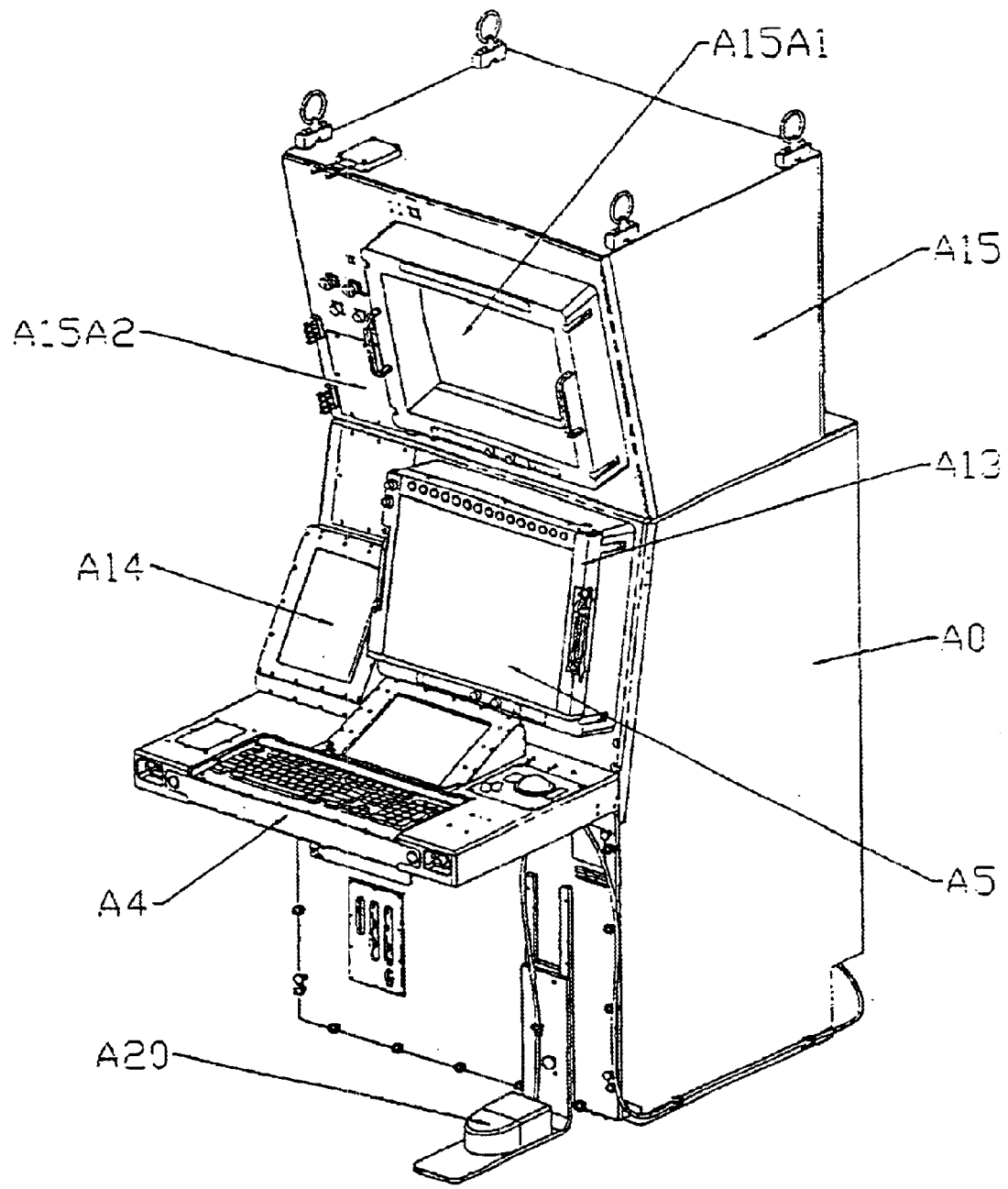
FIG. 6 is a perspective view of a unit illustration for a database report.
Figure 7:
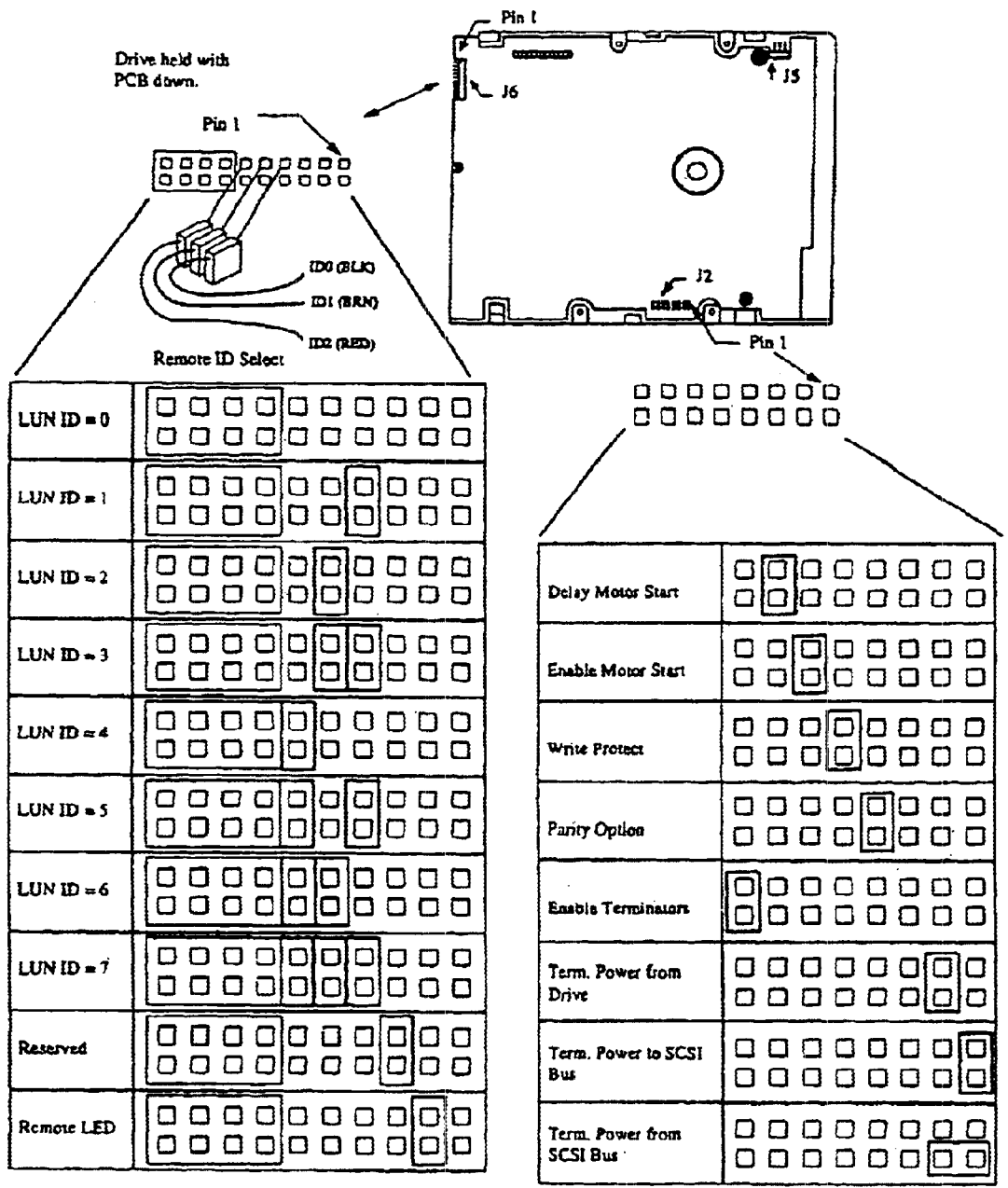
FIG. 7 is a part configuration illustration that shows a representative jumper connection for particular pins of an electronic part.

| Chapter | Title | Description |
|---|---|---|
| 1 | Parts List (See FIG. 5 for an example) | A report containing a list of parts sorted by either part number or reference designator. A group of parameters containing information such as item serial numbers could also be reported. |
| 2 | Illustrations (See FIGS. 6 and 7) | A report containing the illustrations within a unit followed by a unit functional block diagram, followed by the location definition and followed by the part drawings. |
| 3 | Processor Groups (See FIG. 8) | A report containing a list of the processor groups and associated fields. This report could also contain a list of all the parts assigned to each processor group. It may also be practical to include configuration parameters of operating system software in each processor group. |

TABLE XXXIII-continued

Configuration Identification Index Report

| Chapter | Title | Description |
|---|---|---|
| 4 | Configuration Parameters (See FIG. 9) | A report containing a list of all parts with configuration parameter groups not previously reported. The parts would be organized in part number or reference designator order. The parameters for each part would be presented in group order and then parameter order (alphabetical). |
| 5 | Interconnection (See FIG. 10) | A report containing a list of all interfaces and their mates or No Connect flags. The interfaces would be organized in reference designator order and interface name order. |
| 6 | Cable Tags (See FIG. 11) | A report containing a list of all interfaces requiring cable tags and the marking required for the tags. |

An example use of the present invention is the documentation of the construction of a computer assembly. The part types of a computer may include, power system (power supplies, fans, etc.), human machine interface (keyboards, monitors, etc.), circuit cards (processors, I/O, etc.), storage devices (hard disk, tape, CD ROM etc.), enclosures (cabinets, panels, etc.), networking (routers, switches, transceivers, etc.) and cables. Software can come in two categories, installed and uninstalled. Installed software, such as operating systems can be put in the same category as storage devices and given size zero. Then the software can be located on the storage device during the location assignment process. Uninstalled software would be treated as spare parts since it is separate from the assembly. A variable computer using circuit card slots and a backplane may support multiple processors and operating systems. Processor groups would be used to separate storage devices, circuit cards and HMI devices into their respective groups. Circuit cards that are mezzanines on other cards and do not require additional slots cm be assigned size zero and added to locations along with the primary circuit card in the location. All of the types of illustrations; part, equipment and functional block diagram, could be used to complement the tabular data. A genealogy of reference designators would be used with each location assigned a unique reference designator and each cable assigned a unique reference designator. The equipment illustration would show the reference designators for locations.

The basic process for configuring a computer is to define the parts and their associated operating system compatibility matrix parameters and interfaces 401. The next step is to define the locations in the enclosure for the subassemblies and create part families for the locations 402. The last step is to construct the computer by creating the unit with selected a location definition, build the parts list, assign the parts to locations, define the processor groups; assign the parts to processor groups, define the interconnections, select configuration parameters and assign values to the parameters. The unit may then be assembled and tested 404 according to the configuration defined in the database and the CII report may be generated. The data may be used to support the product 405 after delivery.

The present invention is equally capable of documenting the construction of a system of many computers connected by a network Instead of reference designators for locations within a enclosure, the locations may be defined by a grid within a building. Each computer in the building would be assigned a location. Other parts such as software (size=0) could be added to each computer. The configuration parameters for the computer could identify specific configuration information about the computer such as hardware features. Other parts such as networking hubs and switches would also be included. The interconnect definition would completely define the network topology. Parameters such as cable lengths could be recorded as well as installation dates, cable routing information, and maintenance records. The process for configuring a computer system is identical to the process for configuring a computer assembly, although more dynamic since a typical installation is constantly changing.

Although the embodiment preferred by the inventor is electronic units, the invention is applicable to virtually any type of manufactured goods, particularly where the good is produced with a number of configurations or versions, such as automobiles, computers, airplanes and many other products.

What is claimed:

1. A method of using a relational database, to record and retrieve configuration information on a unit of manufacture comprising, at least one each of a parts information lookup table, a location information lookup table, a unit storage table, and a pair of configuration management storage tables, wherein said pair of configuration management storage tables are linked together, and one of said configuration management storage tables of said pair of linked configuration management storage tables is a configuration management status table and the other is a configuration management memo table;

comprising accessing both of said linked configuration management storage tables by using a first index key, which defines a group of configuration management records for a part definition, location definition, or unit definition, and a second configuration management index key which defines the current configuration management records for a part definition, location definition, or unit location wherein:

(a) said location information lookup tables provide a list of available locations to place a part in a unit of manufacture, and further comprise a location definition lookup table, and (b) said parts information lookup tables provide a catalog of parts and further comprise a parts list lookup table used to identify each part, and (c) a set of parameter information lookup tables related to said parts list lookup table for defining any number of parameters of information unique to each part, comprised of a parameter definition lookup table defining a list of said parameters for each part, which is related to a parameter list lookup table which defines a list of parameters that may be associated with any part in said parts list table; and (d) said unit storage tables provide the configuration of a unit of manufacture comprising:

(i) a unit definition storage table, which is related to said location information lookup table to identify a specific unit of manufacture, and (ii) a unit parts list storage table, which is related to one or more of said parts in said parts list information lookup tables to provide a list of parts for each said unit of manufacture, where each part in said unit parts list storage table is assigned a location from said location definition lookup table, and (iii) a unit parameter list storage table, which is used to record configuration parameter values for each part in said unit of manufacture, which is related to both said unit parts list storage table and said parameter definition lookup table.

2. A method as claimed in claim 1, wherein said location definition lookup table is related to a part family definition lookup table which is related to said parts list lookup table for identifying which parts are compatible with each location of said location definition.

3. A method as claimed in claim 1, wherein said location definition lookup table is related to an equipment type definition lookup table for identifying any number of different types of units of manufacture.

4. A method as claimed in claim 1, wherein said location definition lookup table is related to a location description lookup table for defining one, or more locations for a type of unit of manufacture.

5. A method as claimed in claim 1, wherein said parts list lookup table is related to a part type lookup table for grouping said parts into part categories.

6. A method as claimed in claim 1, wherein said parts in said parts list lookup table are related to a kit definition lookup table for grouping said parts into kits.

7. A method as claimed in claim 1, wherein said unit parts list storage table is related to a processor group storage table for grouping parts associated with a processor.

8. A method as claimed in claim 1, comprising an interface definition lookup table and a unit interconnect storage table, wherein said parts list lookup table is related to said interface definition lookup table for defining interfaces unique to a part in the parts list, and said unit parts list storage table is related to said unit interconnect storage table, which is related to said interface definition lookup table for defining connections between parts in said unit parts list.

9. A method as claimed in claim 8, wherein said interface definition lookup table is related to an interface family lookup table for identifying compatible mating connections of said parts.

10. A method as claimed in claim 1, wherein said parameter list lookup table is related to a parameter group definition lookup table for grouping said parameters into parameter categories.

11. A method as claimed in claim 1, wherein said parameter list lookup table is related to a parameter description look up table for defining multiple groups of parameters, which allow multiple pre-defined configurations of a part.

* * * * *